March 13, 1956 W. G. FASTIE 2,737,809
DOUBLE BEAM RADIATION PYROMETER
Filed Feb. 7, 1950 3 Sheets-Sheet 1

*Fig. 1-A*

*INVENTOR.*
WILLIAM G. FASTIE
BY
Woodcock and Phelan
ATTORNEYS

March 13, 1956  W. G. FASTIE  2,737,809
DOUBLE BEAM RADIATION PYROMETER
Filed Feb. 7, 1950  3 Sheets-Sheet 2
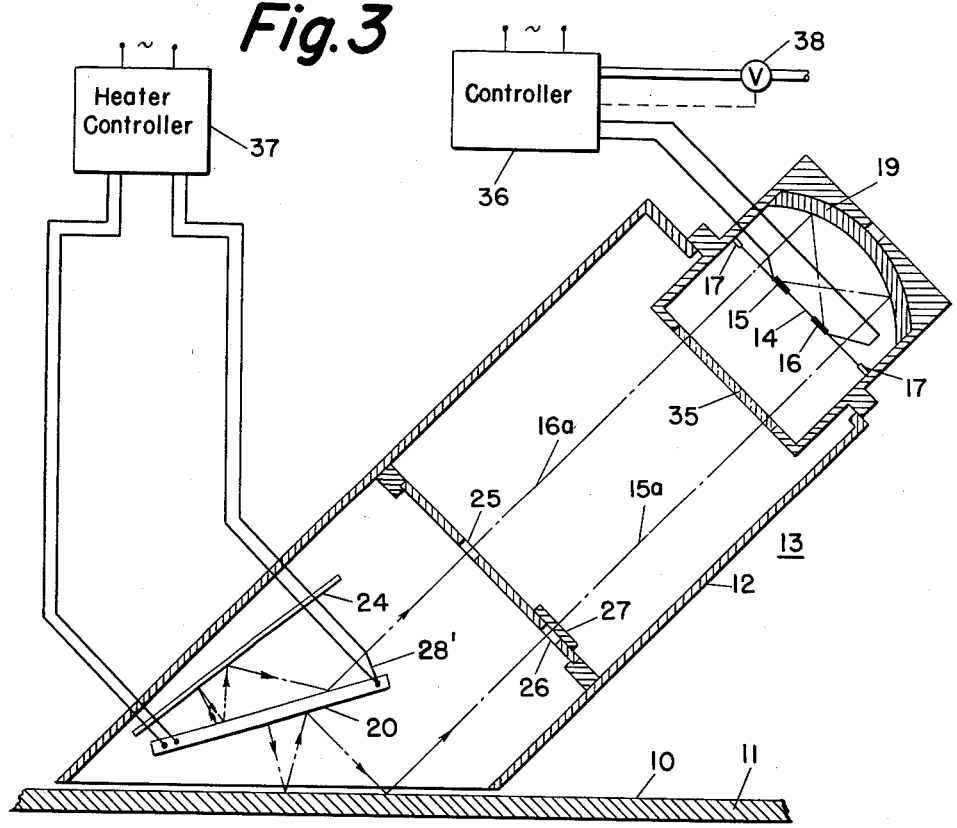
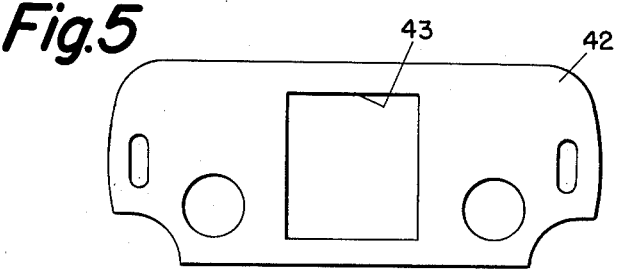
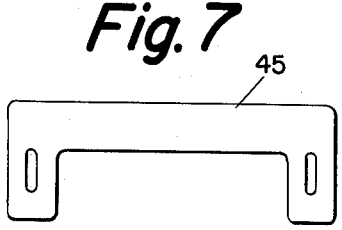
*INVENTOR.*
WILLIAM G. FASTIE
BY
Woodcock and Phelan
ATTORNEYS

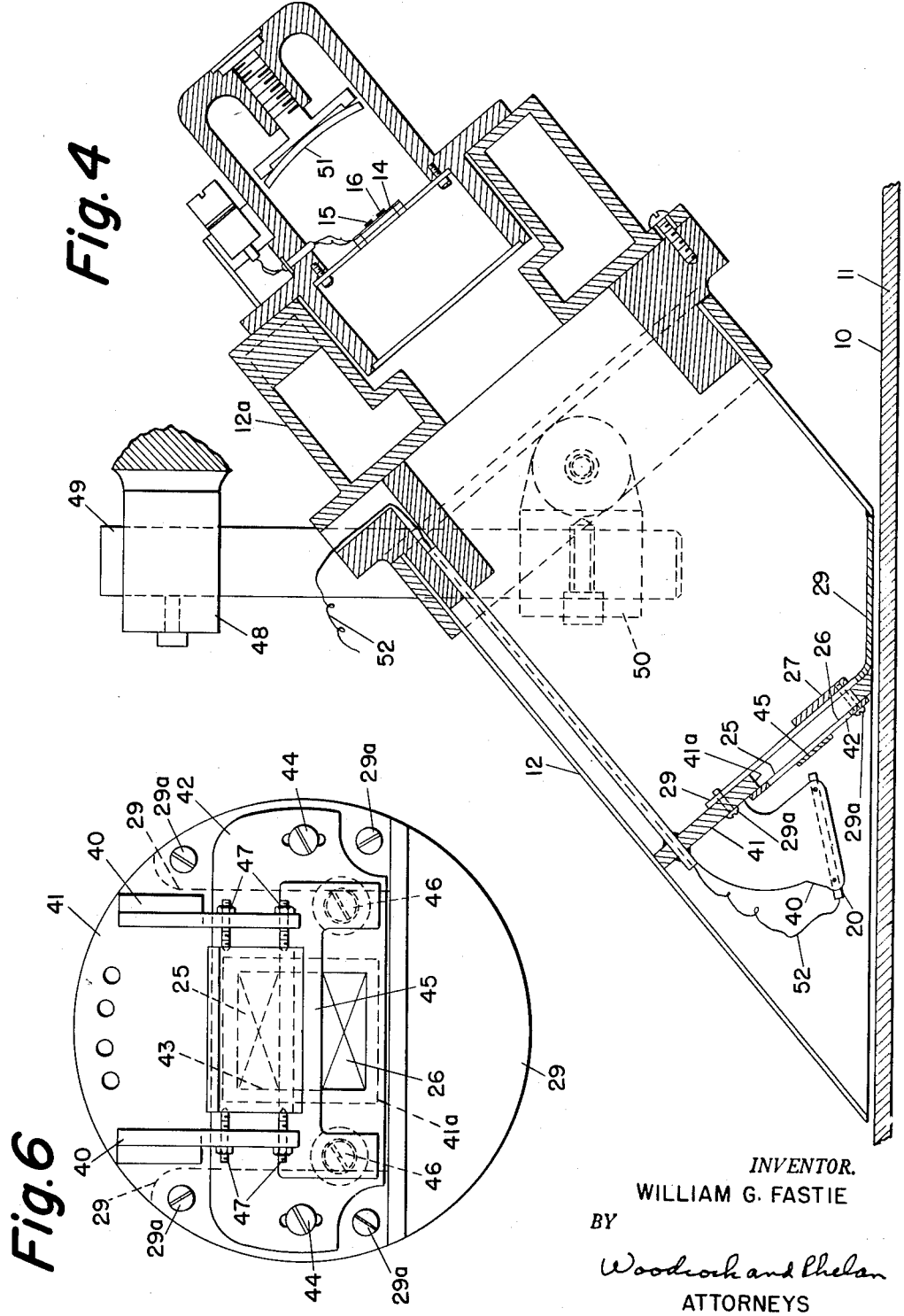

United States Patent Office 2,737,809
Patented Mar. 13, 1956

2,737,809

DOUBLE BEAM RADIATION PYROMETER

William G. Fastie, Willow Grove, Pa., assignor to Leeds and Northrup Company, Philadelphia, Pa., a corporation of Pennsylvania Application February 7, 1950, Serial No. 142,795

18 Claims. (Cl. 73—355)

This invention relates to methods of and apparatus for measuring the temperature of a body from which radiant energy is emitted and has for an object the provision of a temperature measuring system of improved accuracy, notwithstanding non-uniform emissivity of the surface of the body whose temperature is to be measured. This system also avoids errors due to the existence of smoke, fumes or other intervening media between the area whose temperature is to be measured and a radiation responsive device. This system likewise avoids errors which result from the calibration of the conventional types of optical pyrometers and total radiation pyrometers and errors due to the effects of the temperature coefficient of voltage output exhibited by such conventional types of instruments.

Heretofore the determination of the temperature of unenclosed non-black-body surfaces by radiant energy responsive means has involved viewing the surface with an optical or total radiation pyrometer and introducing or applying a correction which very often is only approximate. Measurements made in accordance with the foregoing methods are, in general, subject to large errors because of the difficulties in determining the corrections to be applied. The particular corrections to be made will depend upon the character of the material under measurement and the conditions under which the measurements are made.

The foregoing will be particularly evident by considering a moving body such as sheet material in the course of manufacture, the new surface areas of which are continuously brought into range of view of a measuring device. The emissivity of such a body or work surface frequently changes in unpredictable manner because of physical differences in different areas of the work surface, changes due to the manufacturing operations, and changes in the surface viewed due to the presence of foreign materials, such as oils, waxes, dirt and the like, having emissivities differing from that of the underlying surface. Likewise the emissivity of most materials changes with change in the temperature.

A perfect radiator, or black body, is characterized by the fact that the energy which it emits depends only on the temperature of the body. A non-black body radiator emits only a fraction of the energy emitted by a perfect radiator, the fraction being known as the emissivity of the body. The emissivity may refer to only a very narrow spectral range, such as is used in optical pyrometry, or a broad spectral range, such as is used in total radiation pyrometers. Thus, in order to relate the energy emitted by a non-black body to temperature, the emissivity must be known. The emissivity of an opaque body is related to its reflectivity by the equation $E+R=1$. When the emissivity is unity, the reflectivity is zero. However, non-black bodies are partial reflectors and their emissivity can never be unity. The total energy leaving an area of a non-black body surface will, in general, be partly emitted radiation and partly reflected radiation. Reflected radiation can cause temperature-measuring errors. For example, a sheet of white paper in daylight appears red hot when measured with an optical pyrometer. When the total of emitted and reflected radiation at every point in the spectral region to which the pyrometer is sensitive is the same as the radiation at every like point in the same spectral region as would be emitted by a black body at the same temperature, black-body conditions are said to exist.

Since in actual practice the opaque bodies or work surfaces whose temperatures are desired to be measured are not perfect black bodies, it follows that the radiation therefrom will not be due to the temperature of the work surfaces alone, since only a part of the radiation falling on them will be absorbed while the remainder will instead be reflected therefrom. Thus, the total radiant energy from a heated opaque work surface will be made up of two components, one due to emission which will be a fraction of the radiant energy which would be emitted from a black body at the same temperature as the work surface, and the other a reflected component due to the reflection of radiant energy from the work surface. When energy in each and all wavelengths utilized in actuating a radiant energy responsive temperature-measuring means has been made to equal the corresponding energy emitted by a black body at the same temperature as the work surface, black-body temperature-measuring conditions will have been attained.

It is an object of the present invention to provide method of and apparatus for establishing known temperature measuring conditions for the determination of the temperature of a body which avoid the need to apply corrections of any kind to the measurement.

It is another object of the invention to provide a null system of measurement in which two beams of radiant energy are respectively directed to the even-numbered and odd-numbered or so-called hot and cold junctions of a thermopile and in which the intensities of the two beams are adjusted to equal each other in order to reduce the output of the thermopile to zero. One radiant energy beam originates from a surface of an illuminator plate whose temperature is adjustable and readily measured, and the other beam originates from an area of the body or work surface to which radiant energy from the illuminator is directed so as to provide a reflected component of radiant energy from the area of work surface of the proper intensity so that the intensity of the sum of emitted and reflected energy from the area will be equal to that which would be emitted from a black-body area at the same temperature.

It is a further object of this invention to provide a measuring system which is free of errors due to the existence of smoke, fumes, or other media between the surface of the body, the temperature of which is to be measured, and radiation-responsive means in spaced relation therewith.

It is a still further object of this invention to provide a measuring system which avoids errors arising in conventional systems as a result of the calibration of conventional type pyrometers and also errors resulting from the temperature coefficient of voltage output inherent in such pyrometers.

The present invention is particularly related to systems of the type disclosed in copending application, Serial No. 142,886, filed February 7, 1950, by Raymond C. Machler, a co-employee of mine; systems of the type disclosed in U. S. Patent No. 2,690,078 which issued upon copending application, Serial No. 142,807, February 7, 1950, by W. E. Phillips, Jr., a co-employee of mine and systems of the type disclosed in U. S. Patent No. 2,611,541 which issued upon copending application, Serial No. 142,799, filed February 7, 1950, by W. T. Gray, a co-employee of mine, certain features of the aforesaid applications being disclosed herein and in themselves not forming part of the present invention.

In carrying out the present invention in one form thereof, two beams of radiant energy are respectively directed to the even-numbered and odd-numbered junctions or so-called hot and cold junctions of a thermopile. One of these beams originates from an area of the body whose temperature is to be measured and comprises a component of radiant energy emitted from the body area and a component of radiant energy reflected by said body area. The reflected energy component primarily originates from one surface of an auxiliary illuminator which is positioned relative to the area of the body in a manner such that when the body and illuminator are at the same temperature a black-body cavity is formed therebetween and the sum of the intensities of the two energy components is equal to the intensity of energy emitted by a so-called black body at the same temperature. The second of these radiant energy beams orignates from a second surface of the illuminator and primarily comprises only radiant energy emitted therefrom. However, as will be later described, the intensity of this energy beam may be increased by providing a reflector suitably disposed relative to the second surface of the illuminator.

More particularly, the sensitive element of the total radiation pyrometer of this invention is so constructed and designed as to have two radiant energy target areas, one area corresponding with the even-numbered junctions of the thermocouples making up the sensitive element, and the other area corresponding with the odd-numbered junctions of the thermocouples making up the sensitive element. Hereinafter the thermojunctions of the thermopile or sensitive element will be referred to as the even-numbered and odd-numbered junctions as the temperature of the junctions may vary with the even-numbered junctions having a higher or lower temperature than the odd-numbered junctions or the temperatures of the odd-numbered and even-numbered junctions may be equal. The two target areas are located side-by-side, supported by the same supports, and in general are subject to the same ambient temperature conditions. An optical system selectively applies to the target areas the respective beams of radiant energy. Accordingly, when the two beams are of equal intensity, the output of the sensitive element is zero. Pursuant to the present invention, measurements may be readily made with greater sensitivity than has heretofore been the case, the system being responsive to differences between the intensities of the two beams of the order which produces an output signal of only two or three microvolts. In addition, since the beams are close together physically, and, hence, substantially equally affected by smoke, fumes or other media present, the existence of smoke, etc. will not affect the accuracy of the measuring system. Likewise since the system is designed to operate using the sensitive element as a null indicator the system is thereby made independent of changes in ambient temperature since the target areas of the sensitive element are equally affected by changes in ambient temperature conditions.

For a more detailed description of the invention and for further objects and advantages thereof, reference is to be had to the following description taken in conjunction with the accompanying drawings, in which:

Fig. 1 diagrammatically illustrates one embodiment of the invention;

Fig. 1-A is an enlarged fractional view of one form of illuminator for use in the various modifications of the invention;

Fig. 2 is a plan view of the differential radiation sensitive device of Fig. 1;

Fig. 3 diagrammatically illustrates the general arrangement of Fig. 1 as applied to an automatic temperature-control system;

Fig. 4 diagrammatically illustrates a radiation pyrometer installation as applied to one form of the invention;

Fig. 5 is a plan view of plate 42 shown in Fig. 4;

Fig. 6 is a plan view of the assembly of partition 41 and its associated parts; and Fig. 7 is a plan view of the adjustable partition 45 of Fig. 6.

Figure 1:
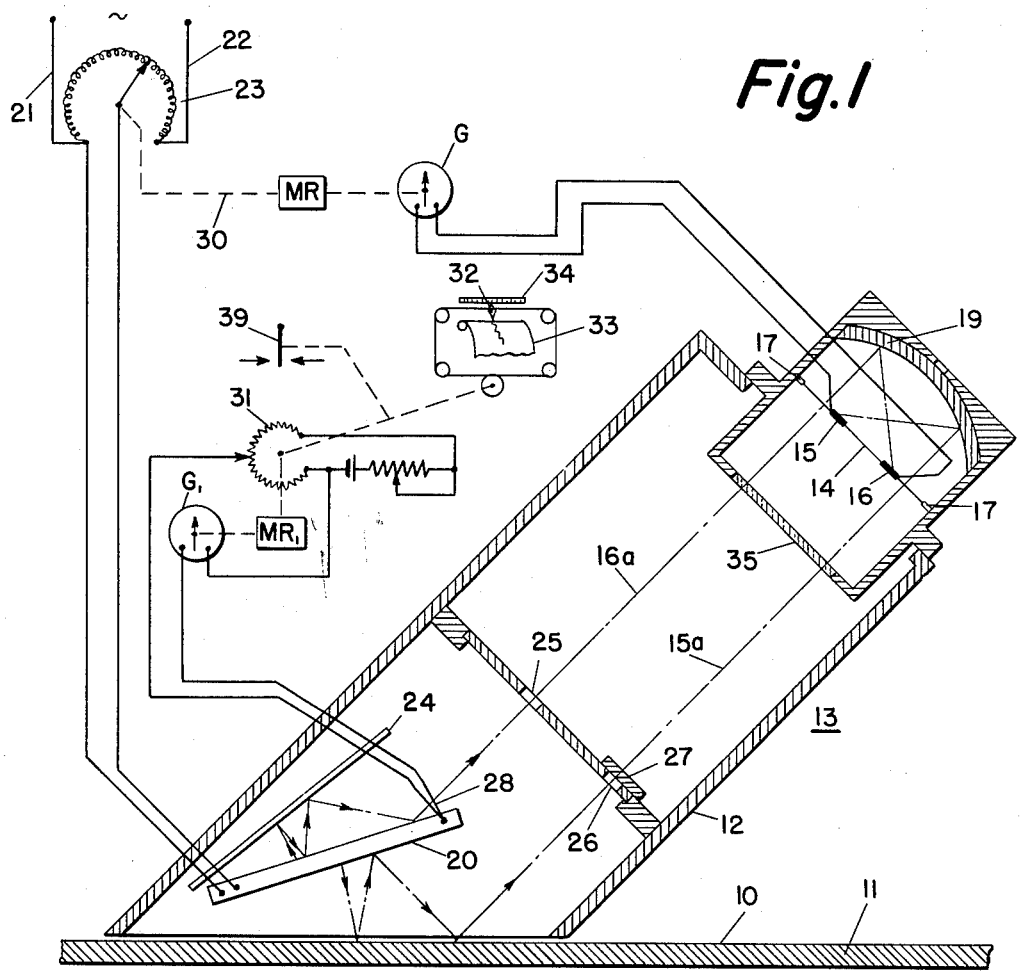
Figure 2:
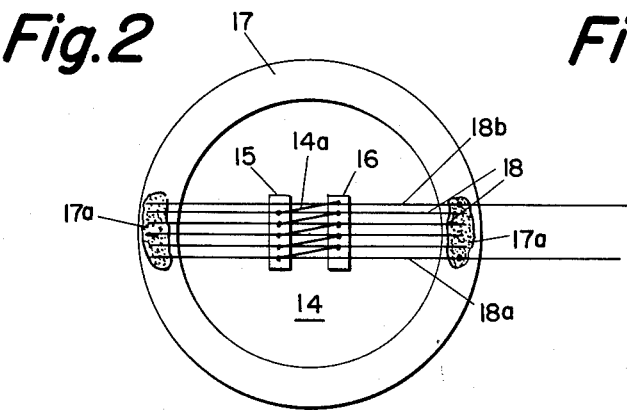
Figure 2:
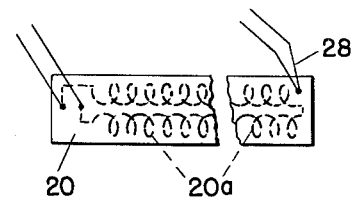

Referring to Fig. 1, the invention has been shown in one form as applied to the determination of the temperature of the surface 10 of work 11 which may comprise a traveling sheet of material, though the invention is equally applicable to the measurement of the temperature of stationary work. Disposed above the surface 10 is a housing 12 of a radiation pyrometer 13 which comprises a sensitive element 14 having target areas 15 and 16. The sensitive element, as shown in plan view of Fig. 2, comprises a plurality of thermocouples 14a, the even-numbered junctions of which would ordinarily correspond with the hot junctions being cemented to a radiation receiver or target 15, while the odd-numbered junctions of the thermocouples normally corresponding with the cold junctions being cemented to the radiation receiver or target 16. The sensitive element 14 is supported from a ring 17 by means of a plurality of fine wires 18, two of which, 18a and 18b, form leads to the sensitive element 14. The ring 17 is suitably mounted in the radiation pyrometer head which is in turn supported by housing 12. As shown, the supporting wires 18 may comprise extensions of corresponding wires of the thermocouples extending diametrically of the ring 17 and attached at opposite ends thereto by suitable means such as cement indicated by the area 17a in Fig. 2. The output of the radiation pyrometer 13 will be a function of the difference between the temperatures of the target areas or radiation receivers 15 and 16, and these temperatures will, of course, depend upon the intensity of the beams of radiant energy directed thereon.

The emissivity of a moving surface 10 is subject to change, due to physical differences in different areas of the material, and also to changes in temperature of the material. The apparent emissivity likewise changes due to the presence of foreign materials, as has already been described. To avoid the effects of changing emissivity, black-body conditions of measurement are established. In accordance with the present invention, a radiant energy directing element or illuminator 20, the temperature of which is controllable, is supported at an angle with respect to surface 10, so that radiant energy derived from the lower surface of the illuminator 20 will be directed to a limited area of surface 10 and be reflected thereby to mirror 19 and the target area 15 of the sensitive element 14. Likewise some radiant energy emitted by the surface 10 will be intercepted by the lower surface of the illuminator 20 and be reflected back onto surface 10 and reflected therefrom to target area 15 of the sensitive element 14. In addition to the reflected energies just mentioned energy emitted from surface 10 will be directed by mirror 19 to the target area 15 of the sensitive element 14. The illuminator 20 is provided with suitable heating means, such as a resistance coil 20a, Fig. 1-A, energized from supply lines 21 and 22 under the control of an adjustable impedance 23 which may be of the commercial form sold under the trade name "Variac." Disposed at an angle with respect to the upper surface of the illuminator 20 is a reflector 24 for intercepting radiant energy emitted by the upper surface of the illuminator 20 and reflecting the intercepted energy back onto the illuminator. By means of such an arrangement, several reflections of the radiant energy will occur, resulting in a beam comprising emitted and reflected energy being directed to the mirror 19 and to the target area 16 of the sensitive element 14. This beam of radiant energy is substantially equal in intensity to that which would be emitted from a black body at the temperature of illuminator 20 as taught in U. S. Patent No. 2,690,078 which issued upon copending application Serial No. 142,807 mentioned earlier in this specification. It is here to be pointed out that the upper and lower surfaces of the illuminator 20 may have like or different emissivities as may be desired as will hereinafter be more fully described.

By suitable optical means such as the reflector 19 and aperture 25, black-body radiation between the upper surface of the illuminator 20 and the reflector 24 is directed solely upon the target area 16, while another aperture 26 limits the radiation between the lower surface of the illuminator 20 and the work surface 10 to the target 15. Neglecting an optical absorber 27, which may or may not be included as will later be described, it will be seen that the output from the sensitive element 14 will be a function of the relative intensity of the two beams 15a and 16a. That is to say, if the intensities of the two beams are equal the output from the sensitive element 14 will be zero.

Though the sensitive element may be connected to any suitable measuring device, it has been illustrated as applied to a galvanometer G forming a component part of a measuring instrument including a mechanical relay MR arranged to drive through a suitable mechanical connection indicated by the broken line 30 a circuit-controlling device 23 illustrated as a variable transformer of the type known to those skilled in the art as a "Variac." If the beam 15a is of greater intensity than the beam 16a, the polarity of the output from the sensitive element will be in one direction, and the polarity will be in the opposite direction when the intensity of beam 16a is greater than that of beam 15a. The galvanometer G will thus deflect to the right or to the left depending upon the polarity, and the mechanical relay MR will drive the variable transformer in a direction to change the energization of the heater coils of illuminator 20 in a direction to change the intensity of the beam 16a to make it approach the intensity of the beam 15a. As the intensity of the beam 16a is changed in a direction to equal that of beam 15a, it will, of course, be understood that the incident component from the illuminator 20 of the beam 15a will be changed in the same direction, but to a lesser degree than the beam 16a. Hence, balance can and will soon be attained. When beams 15a and 16a have the same intensity, black-body conditions of measurement will have been established. The illuminator 20 will then be at the same temperature as the surface 10, and by any suitable means for measuring the temperature of the illuminator 20 or that of the surface 10, utilizing the black-body cavity, the true temperature of surface 10 may be readily ascertained. More particularly, a thermocouple 28 may be attached to the illuminator 20 and connected into a measuring circuit including a galvanometer $G_1$ which through a mechanical relay $MR_1$ adjusts a slidewire 31 relative to its stationary contact and at the same time drives a pen and indicator 32 relative to a record chart 33 to indicate with reference to a scale 34 the true temperature of surface 10 and to leave a record thereof on the chart 33.

The structure of the device 13 of Fig. 1 is subject to many modifications. By selecting the proper material for the illuminator 20 and/or utilizing radiant energy within certain spectral bands of wavelengths, black-body measuring conditions may be obtained without the use of a reflector 24. As previously stated, the reflector 24 above the upper surface of the illuminator 20 is used in the modification of Fig. 1 since a sufficiently perfect black surface cannot generally be produced; however, for some temperature ranges and for specific spectral ranges, substantially black-body surfaces can be produced. The use of a reflector is undesirable for two reasons: first, it is difficult to maintain it highly reflecting; and second, the size of the illuminator must be increased when a reflector is used to provide the required component.

In general it will be desirable to utilize as nearly perfect a black-body illuminator as it is possible to produce so that only one reflection from the work surface will be required to attain near black-body conditions and the preferred system will not require a reflector 24 above the upper surface of the illuminator 20. The illuminator 20 can then be a minimum in size. However, there are also other methods of operation in which a non-black-body surface can be used and which do not require a reflector. If the illuminator is a gray body, i. e., if it has the same emissivity of less than unity at all wavelengths, which reach the receiver, and if its emissivity does not change with temperature, satisfactory operation can be obtained by the use of a light trimmer which may take the form of a spectrally neutral light filter 27 in the path of the beam 15a. In this case the beam 15a is assumed to be black-body radiation from the cavity between the work surface 10 and the lower face of the illuminator 20. The neutral filter reduces the intensity of beam 15a equally at all wavelengths by a factor equal to the reflectivity of the upper surface of the illuminator 20, so that the beams 15a and 16a are equal in intensity whenever the temperatures of the illuminator 20 and that of the work surface 10 are the same. Such a non-black-body surface may be formed by iron oxide. Satisfactory operation has been obtained in the range of temperatures from 300° F. to 700° F. with an iron oxide surface formed on cold rolled steel by heating the same in air to allow the black oxide of iron to form. That surface was used in a system in which the spectral range was limited to the region below ten microns although it is to be understood a wider spectral range may be used. Other examples of non-black body surfaces which are suitable for the above-described use include oxidized copper and oxidized "Nichrome IV," the latter being a gray body in the temperature range from 300° F. to 2000° F.

If the illuminator is neither a gray body nor a black body, i. e., its emissivity is different at different wavelengths but is of a material such that the emissivity thereof does not vary with temperature, satisfactory operation can be obtained if the light filter 27 has absorption characteristics such that its transmissivity equals the emissivity of the illuminator at each wavelength. For example, if the upper surface of the illuminator has an emissivity on the short wavelength end of the spectral region equal to .6, i. e., $e_{\lambda_1}=.6$, and an emissivity in the long wavelength region equal to .8, i. e., $e_{\lambda_2}=.8$, then the filter 27 must have a transmissivity of .6 at spectral region $\lambda_1$, i. e., $Tr_{\lambda_1}=.6$, and a transmissivity at spectral region $\lambda_2$ of .8, i. e., $Tr_{\lambda_2}=.8$. Under these conditions, the beams 15a and 16a will be equal whenever the temperature of illuminator 20 is equal to that of the work surface 10. A glass coated sheet of platinum is an example of such an illuminator, it being a poor emitter in the region from 3 to 4 microns, and a much better emitter (almost a black body) in the region from 4 to 7 microns, the emissivity values in the two regions not changing materially with temperature. If a filter is used in the path of the rays coming from the cavity between the illuminator and the work surface which filter transmits less in the 3–4 micron region than it does in the 4–7 micron region, it will tend to maintain equality in the two beams at all wavelengths. In particular, if the filter is a so-called powder filter, consisting of a layer of small particles of an infra-red transparent material such as magnesium dioxide, or quartz, the particles acting as light scatterers and scattering short wavelength radiation more effectively than long wavelength radiation, the filter will have the general characteristics required. By varying the thickness of the particle layer, and/or the particle size, the spectral transmission characteristics can be adjusted so that the transmissivity of the powder filter is approximately equal to the emissivity of the glass at all wavelengths between 3 microns and 7 microns.

If the illuminator is a gray body with an emissivity which varies with temperature, or if the illuminator is a non-gray body whose emissivity varies with temperature, satisfactory operation cannot in general be obtained by use of optical filters, although satisfactory operation can be attained in a few cases, several of which will now be discussed. For example, assume at a temperature $T_1$ with an emissivity at spectral region $\lambda_1$ of .6, i. e., $e_{T_1\lambda_1}=.6$, an emissivity at spectral region $\lambda_2$ of .8, i. e., $e_{T_1\lambda_2}=.8$, the energy J in each of the two spectral regions $\lambda_1$ and $\lambda_2$ at the temperature $T_1$ is the same, i. e., $J_{T_1\lambda_1}=J_{T_1\lambda_2}$, and is equal to ten arbitrary energy units. Also, assume at a temperature $T_2$ with an emissivity at spectral region $\lambda_1$ of .7, i. e., $e_{T_2\lambda_1}=.7$, an emissivity at spectral region $\lambda_2$ of .72, i. e. $e_{T_2\lambda_2}=.72$, the energy J in the spectral region $\lambda_1$ is equal to eighteen units, i. e., $J_{T_2\lambda_1}=18$ units, and the energy J in the spectral region $\lambda_2$ is equal to 22 units, i. e., $J_{T_2\lambda_2}=22$ units. If a filter 27 were used with a transmissivity value in the spectral region $\lambda_1$ of .6, i. e. $Tr\lambda_1=.6$ and a transmissivity value in the spectral region $\lambda_2$ of .8, i. e., $Tr\lambda_2=.8$, then the intensity of beams 15a and 16a will be substantially equal whenever the illuminator surface 20 and the work surface 10 are at the same temperature in the temperature range $T_1$ to $T_2$. This may be shown mathematically by substituting the above values in the following equations wherein the energy in beam 16a at temperature $T_1$ is equal to:

$$(e_{T_1\lambda_1})(J_{T_1\lambda_1})+(e_{T_1\lambda_2})(J_{T_1\lambda_2})=(.6)(10)+(.8)(10)$$

$$=6+8=14 \text{ energy units}$$

and the energy in the beam 15a at temperature $T_1$ is equal to:

$$(Tr_{\lambda_1})(J_{T_1\lambda_1})+(Tr_{\lambda_2})(J_{T_2\lambda_2})=(.6)(10)+(.8)(10)$$

$$=6+8=14 \text{ energy units}$$

Similarly, the energy in the beam 16a at temperature $T_2$ is equal to:

$$(e_{T_2\lambda_1})(J_{T_2\lambda_1})+(e_{T_2\lambda_2})(J_{T_2\lambda_2})$$

$$=(.7)(18)+(.72)(22)$$

$$=12.6+15.84=28.44 \text{ energy units}$$

and the energy in the beam 15a at temperature $T_2$ is equal to:

$$(Tr_{\lambda_1})(J_{T_2\lambda_1})+(Tr_{\lambda_2})(J_{T_2\lambda_2})$$

$$=(.6)(18)+(.8)(22)$$

$$=10.8+17.6=28.4 \text{ energy units}$$

This conclusion assumes that the spectral emissivity will vary in the temperature range $T_1$ to $T_2$ in such a way as to maintain the balance in the beams at all temperatures.

If the emissivity of the illuminator changes with temperature in a known way, electrical correction for this characteristic can be made. One method of correction would involve operation of the illuminator at a slightly different temperature than that of the work surface above or below a certain selected temperature, lower at one extreme of surface temperature and higher at the other. At an intermediate point in the temperature range, the temperature of illuminator 20 and that of the work surface 10 would be the same and a light trimmer 27 would be used to balance the beams 15a and 16a at this point. With this arrangement, means are also required to compensate in the recording mechanism for the illuminator temperature values above and below the certain selected temperature. This may be accomplished, for instance, by introducing corrective variations in the record on the chart 33 by use of a non-linear slidewire 31 by the use of a correcting cam in the mechanical system that drives the pen 32, or by the use of an especially calibrated chart 33. The correction factor would, however, be dependent on the emissivity of the surface 10 and would, therefore, not appear to be a desirable mode of operation. However, operation in this manner would usually yield better temperature measurements than can be obtained with a standard pyrometer. The mathematical form of the correction to be applied would depend on the temperature-emissivity characteristic of the illuminator. Because of the defects in this method of operation, only small changes in emissivity with temperature can be tolerated, so that a linear correction factor would probably be adequate in instances where this method is usable.

Another electrical means for correcting for changes in emissivity of the illuminator with temperature is the use of a small potential in series with the differetnial thermopile, used in conjunction with a neutral filter 27 in the beam 15a. For example, assume that at temperature $T_1$ the emissivity of the illuminator is .7, i. e., $e_{T_1}=.7$, the transmissivity of the filter is .8, i. e., $Tr_{T_1}=.8$, and the energy value is 10 units, i. e., $J_{T_1}=10$. The energy beam 15a will have an intensity equal to:

$$(Tr_{T_1})(J_{T_1})=(.8)(10)=8 \text{ energy units}$$

and the energy beam 16a will have an intensity of $$(e_{T_1})(J_{T_1})=(.7)(10)=7 \text{ energy units}$$

the difference in intensity between the two beams being one energy unit. At temperature $T_2$, if the emissivity is .75, i. e., $e_{T_2}=.75$, the transmissivity is .8, i. e., $Tr_{T_2}=.8$ and the energy value is 20 units, i. e., $J_{T_2}=20$, then the energy beam 15a will have an intensity equal to $$(Tr_{T_2})(J_{T_2})=(.8)(20)=16 \text{ units}$$

the energy beam 16a will have an intensity equal to $$(e_{T_2})(J_{T_2})=(.75)(20)=15 \text{ units}$$

and the difference between the intensities of the two beams will likewise be one energy unit. The appropriate potential in series with the thermopile can, therefore, maintain zero voltage at the galvanometer G for both temperatures. It can be seen that this condition cannot be obtained by adjusting the value $Tr$ of the filter 27. The only disadvantage of this mode of operation is that the thermopile is not operated at null, but since the unbalance is small, there is no serious objection to such operation.

The terms "upper surface" and "lower surface" have been selected for ease in designating the surfaces of the illuminator 20 in regard to their relative positions with respect to the work surface 10 as illustrated in the accompanying drawings. It is to be understood that the designation of one surface of the illuminator 20 as the "upper surface" in all cases refers to the surface of the illuminator from which beam 16a is derived. Similarly, the designation "lower surface" refers to the surface of the illuminator adjacent the surface of the body whose temperature is to be measured or controlled.

The above relationship will always remain the same whether the radiation pyrometer 13 is located above or below the body under measurement or to one side of the body. For example, if the emissivity of the upper surface of the illuminator 20 is 0.9, the intensity of the beam 16a will be but 90% of the beam 15a when the temperature of the illuminator 20 is equal to that of the surface 10. Thus, the absorber 27 is designed to transmit only 90% of the radiant energy of beam 15a. Numerically, the absorber reduces the intensity by a fraction equal to the reflectivity of the illuminator or transmits a beam of intensity which is that fraction of the intensity of the beam from the blackbody cavity formed between the lower surface of the illuminator and the area of surface 10 equal to the emissivity of the upper surface of the illuminator 20. Accordingly, the output of the sensitive element 14 will be made zero when the illuminator 20 is at the same temperature as the surface 10.

As previously pointed out, the upper and lower surfaces of the illuminator 20 may have like or different emissivities. For example, if the upper surface of the illuminator has a relatively high emissivity, such as 0.9, as in the previous illustration, the lower surface of the illuminator 20 may have the same or a different emissivity value.

The system of this invention takes advantage of the null thermoelectric measurement, which allows a lower voltage signal to be measured and, therefore, does not usually require the high voltage sensitivity to change in the radiant energy emitted from the work surface that is obtained by using a good reflector on the lower side of the illuminator, as described in U. S. Patent No. 2,611,541 which issued upon copending application Serial No. 142,799, filed February 7, 1950, by W. T. Gray, a co-employee of mine. However, where the emissivity of a work surface is of the order of 0.1 or lower, Gray's system is desirable for use in obtaining higher sensitivity. As pointed out by Gray in his application, the gain in sensitivity by the use of a high reflecting illuminator is greatest when the emissivity of the work surface is low. If the work has an emissivity of 0.5, a perfect reflector produces a gain in sensitivity by only a factor of 2 over a black-body illuminator, but requires an illuminator 4 or 5 times as large; hence for such application my invention can be used to advantage.

With the foregoing understanding of the invention, it will now be apparent that it may be applied to systems of different character. For example, in Fig. 3, the differential output from the sensitive element 14 may be applied to a suitable control device 36 which may include an amplifier for controlling the temperature of the work 11 or other conditions of a process in which temperature is important. In this case, a thermocouple 28' and a heater controller 37 are utilized to maintain the illuminator 20 at a predetermined temperature, as at the control point. Thus, if the temperature of the surface 10 varies from the control point, the controller 36 will function to regulate a valve 38 to regulate the steam which may be utilized for heating the work 11. The valve 38 is to be taken as representative of any control device such as the variable transformer 23, and the like.

It is to be observed that the arrangement of Fig. 3 is not the only manner in which the system may be applied to the control of the temperature of the surface 10. In Fig. 1, for example, the mechanical relay MR₁ may be utilized to operate switch contact 39 to open and close the control circuits, the switch 39 being intended symbolically to represent suitable control structure such as shown in Ross et al. Patent No. 2,096,064.

In the preferred form of the invention, as illustrated in Fig. 4, the illuminator 20 is supported in close proximity with the surface 10 by means of a bracket 40 extending from a partition 41 between the opposite walls of the housing 12. The partition 41 is mounted within the open end of the housing 12 upon a bifurcated bracket 29 and is secured thereto by means of screws 29a, Figs. 4 and 6. A plate 42 having a rectangular opening 43, Fig. 5, somewhat less in size than the opening 41a through the partition 41, is adjustably secured to partition 41 as by cap screws 44, Fig. 6, the adjustment being provided to provide ease of adjustment with reference to the optical system including the sensitive element 14.

An adjustable partition 45, Fig. 7, is likewise secured to the partition 41 by means of cap screws 46 and serves to divide the opening 43 into two parts which may be of the same area or of different areas depending upon the needed calibration to the system as a whole and can be utilized to accomplish the purpose of absorber 27 of Fig. 1. It may be further observed from Fig. 6 that the bracket 40 is bifurcated with the illuminator 20 extending between the depending arms and secured thereto as by the mounting screws 47.

The assembly as a whole is supported from stationary member 48 encircling a rod 49 to which the housing 12 is pivotally connected by bracket 50. At the rear of the housing 12, which in Fig. 4 is shown as made up of an upper section 12a bolted to flanges of the lower section, there is located the radiation pyrometer head in which is located the reflecting mirror 51 which is adjustable with respect to the sensitive element 14. The optical arrangement is the same as explained in connection with Fig. 1 for concentration of one beam on the target 15 and the other beam on the target 16. As well understood by those skilled in the art, the optical arrangement is preferably such that the images of the apertures 25 and 26 respectively fall upon the targets 16 and 15. The cable 52 in Fig. 4 may include both the leads to the heating element in the illuminator 20 as well as the leads to the thermocouple as schematically illustrated in Figs. 1 and 3.

The assembly shown in Fig. 4 may be employed for automatically measuring the temperature of the surface 10 by including it in a measuring system such as the system illustrated in Fig. 1 and described therewith. The assembly of Fig. 4 may also be used for automatically controlling the temperature of the surface 10 by including it in a control system such as the system described in connection with Fig. 3 or by modifying the system shown in Fig. 1 in a manner as previously described.

While certain specific embodiments of this invention have been described and shown it will be understood that further modifications may be made without departing from the spirit and scope of the invention as set forth in the appended claims.

What is claimed is:

1. In a system for measuring the temperature of an opaque body from which radiant energy is emitted which comprises a radiant energy directing element, means for heating said element for emission of radiant energy to a limited area of the surface of said opaque body, means supporting said directing element with respect to said limited area for multiple reflection of radiant energy therebetween effectively to produce black-body radiation from said limited area, two radiation-responsive means each receiving separate radiant energy beams respectively from said element and from said limited area, structure cooperating with one of said beams for changing its normal intensity prior to receipt by said corresponding radiation-responsive means, means for adjusting said heating means to equalize the radiant energy beams received by said radiation-responsive means from said element and from said limited area, and temperature-responsive means thermally associated with said element for measurement of the temperature thereof as a measurement of the temperature of said opaque body when the intensities of said beams of radiant energy are equal.

2. In a system for measuring the temperature of an opaque body from which radiant energy is emitted which comprises a radiant energy directing element having an emissivity less than unity, means for heating said element for emission of radiant energy to a limited area of the surface of said opaque body, means supporting said directing element with respect to said limited area for reflection of radiant energy therebetween effectively to produce black-body radiation from said limited area, radiation-responsive means separately receiving radiant energy beams respectively from said element and from said limited area, temperature-responsive means thermally associated with said element for measurement of the temperature thereof, and compensating means cooperating with said radiation-responsive means for compensating in the system for the decreased intensity of a reference beam of radiant energy from said element due to its less-than-unity emissivity for measurement of the temperature of said element by said temperature-responsive means as a measurement of the temperature of said opaque body upon establishment of a predetermined relationship of intensities between said beams of radiant energy as determined by said radiation-responsive means.

3. The combination set forth in claim 2 in which said compensating means comprises a filter disposed between said limited area of said body and said radiation-responsive means for decreasing the intensity of the black-body radiation from said limited area by a fraction equal to the reflectivity of the area of said directing element from which said reference beam is derived to form a beam from said limited area bearing a predetermined relation to said reference beam from said directing element.

4. The combination set forth in claim 2 in which said compensating means comprises a radiant energy filter disposed between said limited area of said body and said radiation-responsive means for transmitting that fraction of black-body radiation from said limited area which is numerically equal to the emissivity of the area of said directing element from which said reference beam is derived.

5. The combination set forth in claim 4 in which said filter has a transmissivity for a given spectral range equal to the emissivity of said directing element for the same spectral range.

6. A system calibrated with respect to radiant energy emitted from a surface having an emissivity of substantially unity for determining the temperature of an opaque body having an emissivity less than unity comprising radiation-receiving means disposed to receive a radiant energy beam from a limited area of said opaque body, said beam comprising a component of radiant energy emitted from said limited area and a component of radiant energy reflected from said limited area, an illuminator having at least two surfaces for directing radiant energy, the first of said surfaces adapted for applying to said limited area an incident quantity of radiant energy for reflection therefrom, said illuminator surfaces having an emissivity less than unity, means for heating said illuminator, a second radiation-receiving means disposed to receive a radiant energy beam from the second surface of said illuminator, said beam comprising a component of radiant energy emitted from said second surface of said illuminator, means for applying to said second surface of said illuminator radiant energy of intensity to reflect therefrom radiant energy of intensity which increases the sum of said emitted and reflected components of said illuminator beam substantially to equal the intensity of a beam which would be emitted by the second surface of said illuminator were the emissivity thereof unity, means for adjusting said heating means for varying the temperature of said illuminator to increase the component of radiant energy reflected from said opaque body until the intensity of the sum of the emitted and reflected components of said opaque body beam is equal to the intensity of the sum of the emitted and reflected components of said illuminator beam, and means for measuring the temperature of said illuminator as a replica of the temperature of said opaque body when the intensities of said last-named radiant energy beams are equal.

7. A system calibrated with respect to radiant energy emitted from a surface having an emissivity of substantially unity for determining the temperature of an opaque body having an emissivity less than unity, comprising an illuminator having at least two surfaces, the first of said illuminator surfaces being disposed for supplying to a limited area of said opaque body radiant energy for reflection therefrom, said illuminator surfaces having an area less than the area of said opaque body and having an emissivity less than unity, a differential radiation-receiving means disposed to receive a first radiant energy beam from the second surface of said illuminator and a second radiant energy beam from said limited area of said opaque body, said first beam comprising a component of radiant energy emitted from said second surface of said illuminator and a component of radiant energy reflected from said second surface, said second beam comprising a component of radiant energy emitted from said limited area and a component of radiant energy reflected from said limited area, means for heating said illuminator, means for applying to said second surface of said illuminator a quantity of radiant energy for reflection therefrom of radiant energy of a magnitude which increases the sum of said emitted and reflected components of said first beam substantially to equal the intensity of a beam which would be emitted by the second surface of said illuminator were the emissivity thereof unity, means for adjusting said heating means for varying the temperature of said illuminator to increase the reflected component of said second beam until the intensity of the sum of the emitted and reflected components of said second beam is equal to the intensity of the sum of the components of said first beam as indicated by substantially zero output from said differential radiation-receiving means, and means for measuring the temperature of said illuminator as a replica of the temperature of said opaque body when the intensities of said last-named radiant energy beams are equal.

8. An apparatus for measuring temperature of a body from which radiant energy is emitted comprising a differential radiation-responsive means having zero output upon application thereto of separate beams of radiant energy of equal intensity, a housing, means for supporting said radiation-responsive means in fixed relation with respect to said housing, said housing having apertures spaced one from the other between an open end and the closed end thereof for passage within said housing of said separate beams of radiant energy, a reflector supported by said supporting means in a position relative to said radiation-responsive means for producing separate images thereon of said apertures, an illuminator supported from said housing at such an angle as substantially to cover one of said apertures to form a beam of radiant energy as viewed by said radiation-responsive means, the relative position of said illuminator with respect to the open end of said housing being such as to direct radiant energy upon a limited area of the body whose temperature is to be measured for reflection therefrom along with radiant energy emitted from said limited area to form the other beam directed upon said radiation-responsive means through said other aperture, means for controllably heating said illuminator in a sense dependent upon the direction of deviation from zero of the output of said radiation-responsive means to produce a predetermined relationship of intensity between said beams, and means for measuring the temperature of said illuminator as an index of the temperature of said body upon establishment of said predetermined relationship of intensity between said beams as determined by said radiation-responsive means.

9. The combination set forth in claim 8 in which said illuminator has an emissivity substantially less than unity and there is interposed in the beam of radiant energy from said body means for reducing the intensity thereof by an amount to compensate for the emissivity factor of said illuminator below unity such that when the intensity of said two beams is made substantially equal black-body conditions of measurement will have been established.

10. An apparatus for measuring temperature of a body from which radiant energy is emitted comprising a differential radiation-responsive means having zero output upon application thereto of separate beams of radiant energy of equal intensity, a housing, means for supporting said radiation-responsive means in fixed relation with respect to said housing, said housing having apertures spaced one from the other between an open end and a closed end thereof for passage within said housing of said separate beams of radiant energy, a reflector supported by said supporting means in a position relative to said radiation-responsive means for producing separate images thereon of said apertures, an illuminator supported from said housing at such an angle as substantially to cover one of said apertures to form a beam of radiant energy as viewed by said radiation-responsive means, the relative position of said illuminator with respect to the open end of said housing being such as to direct radiant energy upon a limited area of the body whose temperature is to be measured for reflection therefrom along with radiant energy emitted from said limited area to form the other beam directed upon said radiation-responsive means through said other aperture, means for controllably heating said illuminator in a sense dependent upon the direction of deviation from zero of the output of said radiation-responsive means to produce a predetermined relationship of intensity between said beams, a supporting frame rotatably supporting said housing, means for clamping said housing in fixed position with the open end thereof substantially parallel to said limited area of said body, and means for measuring the temperature of said illuminator as an index of the temperature of said body upon establishment of said predetermined relationship of intensity between said beams as determined by said radiation-responsive means.

11. An apparatus for measuring temperature of a body from which radiant energy is emitted comprising a differential radiation-responsive means having zero output upon application thereto of separate beams of radiant energy of equal intensity, a housing, means for supporting said radiation-responsive means in fixed relation with respect to said housing, said housing having apertures spaced one from the other between an open end and a closed end thereof for passage within said housing of said separate beams of radiant energy, a reflector supported by said supporting means in a position relative to said radiation-responsive means for producing separate images thereon of said apertures, an illuminator having an emissivity substantially less than unity supported from said housing at such an angle as substantially to cover one of said apertures to form a beam of radiant energy as viewed by said radiation-responsive means, the relative position of said illuminator with respect to the open end of said housing being such as to direct radiant energy upon a limited area of the body whose temperature is to be measured for reflection therefrom along with radiant energy emitted from said limited area to form the other beam directed upon said radiation-responsive means through said other aperture, means for controllably heating said illuminator in a sense dependent upon the direction of deviation from zero of the output of said radiation-responsive means to produce a predetermined relationship of intensity between said beams, adjustable means for increasing the size of one of said apertures while decreasing the size of the other of said apertures thereby to increase the radiant energy passing through one of said apertures while decreasing the radiant energy passing through the other of said apertures, an absorber disposed in the path of the radiant energy from said limited area to decrease the intensity of the radiant energy by an amount to compensate for the emissivity factor of said illuminator below unity, and means for measuring the temperature of said illuminator as an index of the temperature of said body upon establishment of said predetermined relationship of intensity between said beams as determined by said radiation-responsive means.

12. An apparatus for measuring temperature of a body from which radiant energy is emitted comprising a differential radiation-responsive means having zero output upon application thereto of separate beams of radiant energy of equal intensity, a housing, means for supporting said radiation-responsive means in fixed relation with respect to said housing, said housing having apertures spaced one from the other adjacent an open end thereof for entry into said housing of said separate beams of radiant energy, a reflector supported by said housing in a position relative to said radiation-responsive means for producing separate images thereon of said apertures, an illuminator having an emissivity substantially less than unity supported from said housing at such an angle as substantially to cover one of said apertures to form a beam of radiant energy as viewed by said radiation-responsive means, the relative position of said illuminator with respect to the open end of said housing being such as to direct radiant energy upon a limited area of the body whose temperature is to be measured for reflection therefrom along with radiant energy emitted from said limited area to form the other beam directed upon said radiation-responsive means through said other aperture, means for controllably heating said illuminator in a sense dependent upon the direction of deviation from zero of the output of said radiation-responsive means to produce a predetermined relationship of intensity between said beams, an unheated reflector having reflectivity approaching unity disposed at an angle with respect to said illuminator for multiple reflections of radiant energy therefrom to increase the intensity of the radiant energy from said illuminator alone to approach that of a black body at the temperature of said illuminator, and means for measuring the temperature of said illuminator as an index of the temperature of said body upon establishment of said predetermined relationship of intensity between said beams as determined by said radiation-responsive means.

13. Apparatus for measuring and/or controlling the temperature of a work surface without physical contact therewith comprising a radiation-receiving element adapted to be positioned in spaced relation with the work surface to receive a beam of radiation therefrom, radiant-energy directing means comprising an illuminator having controllable heating means and adapted to be positioned in spaced relation with the work surface, a second radiation-receiving element adapted to be positioned in spaced relation with said illuminator for receiving a beam of radiation therefrom, means for varying the intensity of one of said beams to establish a predetermined relationship between the intensities of said beams, sensitive means associated with each of said radiation-receiving elements and connected differentially for comparing the intensities of said beams to determine when said predetermined relationship exists, a housing containing said radiation-receiving elements and said sensitive means and said illuminator, and means thermally associated with said illuminator for measuring the temperature of said illuminator as an index of the temperature of the work surface upon establishment of said predetermined relationship of intensity between said beams.

14. Apparatus according to claim 13 wherein said means for varying the intensity of one of said beams comprises a radiant-energy filter disposed in the path of radiant energy to be received by said first-named radiation-receiving element.

15. Apparatus according to claim 13 wherein said means for varying the intensity of one of said beams comprises means responsive to the output of said sensitive means to control said controllable heating means of said illuminator.

16. Apparatus according to claim 13 wherein said controllable heating means is preset to maintain the temperature of said illuminator constant at a control point and said means for varying the intensity of one of said beams comprises means operating under control of the output of said sensitive means for varying the temperature of the work surface.

17. Apparatus according to claim 13 wherein said illuminator comprises a plate having an emissivity less than unity, and said means for varying the intensity of one of said beams comprises a reflector plate disposed in face-to-face relationship with said illuminator plate for multiple reflections of radiant energy therebetween to increase the intensity of the radiant energy from said illuminator plate to approach that of a black body at the temperature of said illuminator plate.

18. Apparatus according to claim 13 wherein said illuminator comprises a plate having black-body emission characteristics.

References Cited in the file of this patent

UNITED STATES PATENTS

| | | |
|---|---|---|
| 1,901,192 | Reinhardt et al. | Mar. 14, 1933 |
| 2,115,578 | Hall | Apr. 26, 1938 |
| 2,302,554 | Kingsbury | Nov. 17, 1942 |
| 2,556,841 | Farnell | June 12, 1951 |

FOREIGN PATENTS

| | | |
|---|---|---|
| 113,865 | Great Britain | Mar. 14, 1918 |

OTHER REFERENCES

New Radiation Pyrometer for Low Temperatures, by F. E. Hessey, pp. 23–26 in Instrumentation by Minneapolis-Honeywell Regulator Co., Brown Instrument Co. Div., vol. 3, No. 5, 4th quarter 1948.